(12) United States Patent
Baldemair et al.

(10) Patent No.: US 12,382,371 B2
(45) Date of Patent: *Aug. 5, 2025

(54) SEARCH SPACE MONITORING

(71) Applicant: Telefonaktiebolaget LM Ericsson (publ), Stockholm (SE)

(72) Inventors: Robert Baldemair, Solna (SE); Sorour Falahati, Stockholm (SE); Daniel Chen Larsson, Stockholm (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,409

(22) Filed: Apr. 18, 2024

(65) Prior Publication Data

US 2024/0267833 A1 Aug. 8, 2024

Related U.S. Application Data

(63) Continuation of application No. 18/092,629, filed on Jan. 3, 2023, now Pat. No. 11,991,620, which is a
(Continued)

(51) Int. Cl.
*H04W 48/12* (2009.01)
*H04L 5/00* (2006.01)
*H04W 72/23* (2023.01)

(52) U.S. Cl.
CPC ............. *H04W 48/12* (2013.01); *H04L 5/003* (2013.01); *H04L 5/0048* (2013.01); *H04L 5/005* (2013.01);
(Continued)

(58) Field of Classification Search
CPC ...... H04W 48/12; H04W 72/14; H04L 5/003; H04L 5/0048; H04L 5/005; H04L 5/0051; H04L 5/0053; H04L 5/0057
See application file for complete search history.

(56) References Cited

U.S. PATENT DOCUMENTS 9,408,096 B2 * 8/2016 Kim ..................... H04L 5/0048
10,250,420 B2 4/2019 Nory et al.
(Continued)

FOREIGN PATENT DOCUMENTS

CN 103812602 A 5/2014
EP 3363139 B1 5/2019
(Continued)

OTHER PUBLICATIONS

3GPP, "3rd Generation Partnership Project; Technical Specification Group Radio Access Network; Study on New Radio (NR) Access Technology Physical Layer Aspects (Release 14)", 3GPP TR 38.802 V0.3.0 (Oct. 2016), Oct. 2016, 1-43.
(Continued)

*Primary Examiner* — Michael J Moore, Jr.
(74) *Attorney, Agent, or Firm* — Murphy, Bilak & Homiller, PLLC (57) ABSTRACT

There are provided mechanisms for monitoring search spaces. A first method performed by a wireless device comprises receiving an Orthogonal Frequency-Division Multiplexing (OFDM) symbol in a downlink slot. At least part of the OFDM symbol is included in a device-specific search space and in a common search space. The first method comprises monitoring the device-specific search space for at least one device-specific reference signal (RS) and monitoring the common search space for at least one non-device-specific RS. In a second method, a radio access network node transmits an OFDM symbol included in a device-specific search space and in a common search space. The device-specific search space contains a device-specific RS, or the non-device specific search space contains a non-device-specific RS, or both of these apply.

21 Claims, 6 Drawing Sheets

Related U.S. Application Data continuation of application No. 17/092,943, filed on Nov. 9, 2020, now Pat. No. 11,570,695, which is a continuation of application No. 16/508,460, filed on Jul. 11, 2019, now Pat. No. 10,863,420, which is a continuation of application No. 15/500,700, filed as application No. PCT/SE2016/051077 on Nov. 2, 2016, now Pat. No. 10,397,854.

(52) U.S. Cl.
CPC .......... *H04L 5/0051* (2013.01); *H04L 5/0053* (2013.01); *H04L 5/0057* (2013.01); *H04W 72/23* (2023.01)

(56) References Cited

U.S. PATENT DOCUMENTS

| | | | | |
|---|---|---|---|---|
| 10,397,854 | B2* | 8/2019 | Baldemair | H04W 48/12 |
| 10,863,420 | B2* | 12/2020 | Baldemair | H04W 48/12 |
| 11,570,695 | B2* | 1/2023 | Baldemair | H04L 5/0048 |
| 11,991,620 | B2* | 5/2024 | Baldemair | H04L 5/003 |
| 2008/0181194 | A1* | 7/2008 | Lindoff | H04J 11/0069 370/503 |
| 2011/0274031 | A1* | 11/2011 | Gaal | H04L 5/0051 370/315 |
| 2012/0039283 | A1* | 2/2012 | Chen | H04L 5/0053 455/450 |
| 2012/0093112 | A1 | 4/2012 | Qu et al. | |
| 2013/0044664 | A1* | 2/2013 | Nory | H04L 1/0045 370/336 |
| 2013/0250782 | A1* | 9/2013 | Nimbalker | H04L 1/0038 370/252 |
| 2013/0250874 | A1 | 9/2013 | Luo et al. | |
| 2013/0250882 | A1* | 9/2013 | Dinan | H04L 5/0032 370/329 |
| 2013/0252606 | A1* | 9/2013 | Nimbalker | H04B 17/309 455/434 |
| 2014/0003349 | A1* | 1/2014 | Kang | H04L 1/0046 370/328 |
| 2014/0036747 | A1* | 2/2014 | Nory | H04W 72/20 370/336 |
| 2014/0105157 | A1 | 4/2014 | Yang et al. | |
| 2014/0133370 | A1* | 5/2014 | Chen | H04W 72/23 370/280 |
| 2014/0192786 | A1 | 7/2014 | Skov et al. | |
| 2014/0293946 | A1* | 10/2014 | Suzuki | H04W 72/23 370/329 |
| 2014/0307560 | A1 | 10/2014 | Kim et al. | |
| 2014/0348093 | A1* | 11/2014 | Ihm | H04W 72/23 370/329 |
| 2014/0362758 | A1 | 12/2014 | Lee et al. | |
| 2015/0117240 | A1* | 4/2015 | Liang | H04L 5/006 370/252 |
| 2016/0029351 | A1* | 1/2016 | Shimezawa | H04L 5/0048 370/329 |
| 2016/0043849 | A1 | 2/2016 | Lee et al. | |
| 2016/0081033 | A1* | 3/2016 | Ouchi | H04L 5/14 455/522 |
| 2016/0142898 | A1* | 5/2016 | Poitau | H04W 8/005 370/329 |
| 2016/0242203 | A1* | 8/2016 | You | H04L 5/0082 |
| 2016/0360551 | A1* | 12/2016 | Bergman | H04W 72/02 |
| 2017/0223725 | A1* | 8/2017 | Xiong | H04L 5/0053 |
| 2017/0332359 | A1* | 11/2017 | Tsai | H04B 7/0639 |
| 2017/0339681 | A1* | 11/2017 | Hussain | H04L 1/0038 |
| 2018/0352500 | A1* | 12/2018 | Baldemair | H04L 5/0053 |
| 2019/0068338 | A1* | 2/2019 | Ashraf | H04W 72/20 |
| 2019/0082430 | A1* | 3/2019 | Li | H04L 1/0061 |

FOREIGN PATENT DOCUMENTS

| | | | |
|---|---|---|---|
| IN | 201747015300 | A | 5/2018 |
| JP | 2014529223 | A | 10/2014 |
| RU | 2573643 | C2 | 1/2016 |
| WO | 2009057283 | A1 | 5/2009 |
| WO | 2011074914 | A2 | 6/2011 |
| WO | WO-2013025674 | A1* | 2/2013 .......... H04L 5/0051 |
| WO | 2013112972 | A1 | 8/2013 |
| WO | 2013172370 | A1 | 11/2013 |
| WO | 2014067124 | A1 | 5/2014 |
| WO | 2016032381 | A1 | 3/2016 |
| WO | 2016164739 | A1 | 10/2016 |
| WO | 2018084755 | A1 | 5/2018 |

OTHER PUBLICATIONS

Unknown, Author, "Design of DL channels for shortened TTI", Lenovo, 3GPP TSG RAN WG1 Meeting #84b, R1-162738, Busan, Korea, Apr. 11-15, 2016, 1-5.

Unknown, Author, "Discussion on common control signaling for NR", 3GPP TSG RAN WG1 Meeting #86bis R1-1609275, Lisbon, Portugal, Oct. 10-14, 2016, 1-3.

Unknown, Author, "Discussions on sPDCCH for latency reduction", 3GPP TSG RAN WG1 Meeting #86bis R1-1609214, Lisbon, Portugal, Oct. 10-14, 2016, 1-8.

Unknown, Author, "DL Control Channel Design", 3GPP TSG RAN WG1 #86bis, R1-1609128, Lisbon, Portugal, Oct. 10-14, 2016, 1-3.

Unknown, Author, "DL control channels overview", 3GPP TSG-RAN WG1 #86bis, R1-1610177, Oct. 10-14, 2016, 1-6.

Unknown, Author, "DMRS reuse for data and control", 3GPP TSG-RAN WG1 #86, R1-167038, Gothenburg, Sweden, Aug. 22-26, 2016, 1-3.

Unknown, Author, "Frame structure considerations for URLLC", 3GPP TSG RAN WG1 Meeting #86 R1-167127, Gothenburg, Sweden, Aug. 22-26, 2016, 1-10.

Unknown, Author, "NR DL control channel design considerations", 3GPP TSG RAN WG1 #86bis R1-1608791, Lisbon, Portugal, Oct. 10-14, 2016, 1-5.

Unknown, Author, "On design of search space for short PDCCH", 3GPP TSG-RAN WG1 Meeting #86bis R1-1609324, Lisbon, Portugal, Oct. 10-14, 2016, 1-6.

Unknown, Author, "On NR physical downlink control channel", 3GPP TSG-RAN WG1 #86-bis, R1-1609539, Lisbon, Portugal, Oct. 10-14, 2016, 1-4.

Unknown, Author, "Reference signal design for NR downlink control channel", 3GPP TSG-RAN WG1 #86-bis R1-1609540, Lisbon, Portugal, Oct. 10-14, 2016, 1-2.

Unknown, Author, "sPDCCH search space design", 3GPP TSG-RAN WG1 #86 bis, R1-1610322, Lisbon, Portugal, Oct. 10-14, 2016, 1-6.

* cited by examiner

SEARCH SPACE MONITORING

TECHNICAL FIELD

Embodiments presented herein relate to a method, a wireless device, a computer program, and a computer program product for monitoring search spaces.

BACKGROUND

In communications networks, there may be a challenge to obtain good performance and capacity for a given communications protocol, its various design aspects and the physical environment in which the communications network is deployed.

For example, one design aspect with a considerable impact on performance and capacity for a given communications protocol in a communications network is the use of reference signals (RSs). RSs of different types can be transmitted, received, and used within an orthogonal frequency-division multiplexing (OFDM) symbol.

In addition to RSs, there are basically two types of physical downlink control channels (PDCCHs) envisioned for future radio access technologies; common PDCCHs and device-specific PDCCHs. The PDCCHs may be transmitted in a common control region or a device-specific control region.

In the 3GPP Long Term Evolution (LTE) suite of telecommunication standards, a search space may be understood as a set of candidate control channels which a wireless device is supposed to attempt to decode. There may be more than one search space. In particular, a search space may be a common search space, which is common to all wireless device of the cell, or a device-specific search space, which may have properties determined by a non-injective function of device identity and may thus be shared with some other devices of the cell. In a LTE cell, all search spaces may be contained in a constant set of one or more subbands.

For the PDCCH in 3GPP Rel. 8, the common control region (structured as a common control search space) is located within the protocol layer-1/layer-2 (L1/L2) control regions in the first few OFDM symbols spanning the entire system bandwidth, as well as any device-specific control regions (structured as device-specific search space(s)). In addition, common reference signals (CRS) are transmitted in the entire subframe (including the L1/L2 control region). Any PDCCH in the common or device-specific search space(s) are transmitted using the same antenna weights (beamforming) as the CRS.

The wireless device monitors the common and the device-specific search spaces in respective control regions and uses the CRS to estimate a channel, in order to do blind decoding of possible PDCCH candidates in the search spaces. This prevents device-specific beamforming of any device-specific PDCCHs, since the CRSs are not assumed to be beamformed in a device-specific way. Many of the PDCCH messages are not addressed to individual wireless devices but to a group of wireless devices, for example, random access responses, system information, allocation and paging information.

In 3GPP Rel. 11, a new set of device-specific control channel search space(s) were added along with related device-specific demodulation reference signals (DMRS). This enables the network to send device-specific control messages to a wireless device using device-specific beamforming, for example directed towards a certain wireless device or a certain group of wireless devices. Search spaces known as ePDCCH search spaces (where the prefix e- is short for enhanced) are located in a control region sent (and received) after the L1/L2 symbols in the data region, and are confined to a small subset of resource blocks.

Figure 1:
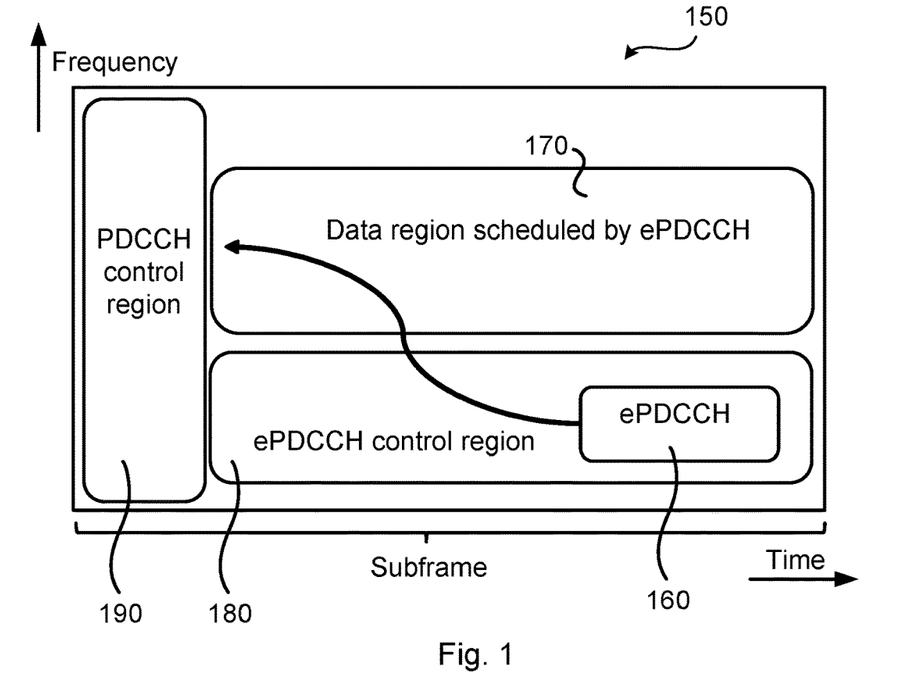
FIG. 1 schematically illustrates a subframe structure according to prior art.

FIG. 1 schematically illustrates an example of a structure of a 3GPP Rel. 11 subframe 150 showing frequency usage (in terms of bandwidth) as a function of time. The subframe 150 comprises a PDCCH control region 190, a data region 170 and an ePDCCH control region 180, where the ePDCCH control region 180 comprises an ePDCCH 160. The ePDCCH 160 may carry control information scheduling a data region 170 in the same subframe. The wireless device monitors the ePDCCH in the one or more ePDCCH search spaces 180. If an ePDCCH 160 is found, the found ePDCCH may identify a data region 170 in the subframe. It follows from FIG. 1 that the decoding of any data in the scheduled data region cannot be started until the ePDCCH region has been fully monitored, that is, after the entire subframe has been received. There may as well be deinterleaving.

Hence, there is a need for an improved monitoring in search spaces.

SUMMARY

An object of embodiments herein is to provide efficient monitoring of search spaces.

According to a first aspect there is presented a method for monitoring search spaces. The method is performed by a wireless device. The method comprises receiving an OFDM symbol in a downlink slot. At least part of the OFDM symbol is included in a device-specific search space and in a common search space. The method comprises monitoring the device-specific search space for at least one device-specific reference signal. The method comprises monitoring the common search space for at least one non-device-specific reference signal.

Advantageously this method provides efficient monitoring of the search spaces, in turn enabling efficient monitoring of control regions.

Advantageously this method for monitoring search spaces reduces latency compared to existing mechanisms for monitoring of control regions. Decoding may start after reception of the control symbol and the first data symbol, instead of at the end of the entire subframe as in existing mechanisms for monitoring of control regions. This latency gain may be possible regardless of whether the control data is common or device-specific.

According to a second aspect there is presented a wireless device for monitoring search spaces. The wireless device comprises processing circuitry and a communications interface. The processing circuitry is configured to cause the wireless device to receive an OFDM symbol in a downlink slot using the communications interface. At least part of the OFDM symbol is included in a device-specific search space and in a common search space. The processing circuitry is configured to cause the wireless device to monitor the device-specific search space for at least one device-specific reference signal. The processing circuitry is configured to cause the wireless device to monitor the common search space for at least one non-device-specific reference signal.

According to a third aspect there is presented a wireless device for monitoring search spaces. The wireless device comprises processing circuitry, a communications interface, and storage medium. The storage medium stores instructions that, when executed by the processing circuitry, cause the wireless device to perform operations, or steps. The operations, or steps, cause the wireless device to receive an OFDM symbol in a downlink slot using the communications interface. At least part of the OFDM symbol is included in a device-specific search space and in a common search space. The operations, or steps, cause the wireless device to monitor the device-specific search space for at least one device-specific reference signal. The operations, or steps, cause the wireless device to monitor the common search space for at least one non-device-specific reference signal.

According to a fourth aspect there is presented a wireless device for monitoring search spaces. The wireless device comprises a receive module configured to receive an OFDM symbol in a downlink slot. At least part of the OFDM symbol is included in a device-specific search space and in a common search space. The wireless device comprises a monitor module configured to monitor a device-specific search space using the at least one device-specific reference signal. The wireless device comprises a monitor module configured to monitor a common search space using the at least one non-device-specific reference signal.

According to a fifth aspect there is presented a computer program for monitoring search spaces, the computer program comprising computer program code which, when run on a wireless device, causes the wireless device to perform a method according to the first aspect.

According to a sixth aspect there is presented a computer program product comprising a computer program according to the fifth aspect and a computer readable storage medium on which the computer program is stored. The computer readable storage medium may be a non-transitory computer readable storage medium.

According to a seventh aspect there is presented a method for enabling monitoring of search spaces, in particular enabling a wireless device's monitoring of search spaces. The method is performed by a radio access network node. The method comprises transmitting an OFDM symbol in a downlink slot. At least part of the OFDM symbol is included in a device-specific search space and a common reference search space. The device-specific search space comprises a device-specific reference signal, and/or the common search space comprises a non-device-specific reference signal.

According to an eighth aspect there is presented a radio access network node for enabling monitoring of search spaces. The radio access network node comprises processing circuitry and a communication interface. The processing circuitry is configured to cause the radio access network node to transmit an OFDM symbol in a downlink slot using the communications interface. At least part of the OFDM symbol is included in a device-specific search space and a common reference search space. The device-specific search space comprises a device-specific reference signal, and/or the common search space comprises a non-device-specific reference signal.

According to a ninth aspect there is presented a radio access network node for enabling monitoring of search spaces. The radio access network node comprises processing circuitry, a communication interface, and a storage medium. The storage medium stores instructions that, when executed by the processing circuitry, cause the radio access network node to transmit an OFDM symbol in a downlink slot using the communications interface. At least part of the OFDM symbol is included in a device-specific search space and a common reference search space. The device-specific search space comprises a device-specific reference signal, and/or the common search space comprises a non-device-specific reference signal.

According to a tenth aspect there is presented a radio access network node for enabling monitoring of search spaces. The radio access network node comprises a transmit module configured to transmit an OFDM symbol in a downlink slot. At least part of the OFDM symbol is included in a device-specific search space and a common reference search space. The device-specific search space comprises a device-specific reference signal, and/or the common search space comprises a non-device-specific reference signal.

According to an eleventh aspect there is presented a computer program for enabling monitoring of search spaces, the computer program comprising computer program code which, when run on processing circuitry of a radio access network node, causes the radio access network node to perform a method according to the seventh aspect.

According to a twelfth aspect there is presented a computer program product comprising a computer program according to the eleventh aspect and a computer readable storage medium on which the computer program is stored. The computer readable storage medium could be a non-transitory computer readable storage medium.

Advantageously this method enables efficient monitoring of the search spaces by the wireless device, in turn enabling efficient monitoring of control regions.

Advantageously this method for enabling monitoring of search spaces enables latency to be reduced compared to existing mechanisms for monitoring of control regions. Decoding is enabled to start after reception by the wireless device of the control symbol and the first data symbol, instead of at the end of the entire subframe as in existing mechanisms for monitoring of control regions. This latency gain may be possible regardless of whether the control data is common or device-specific.

It is to be noted that any feature of the first, second, third, fourth, fifth, sixth seventh, eight, ninth, tenth, eleventh and twelfth aspects may be applied to any other aspect, wherever appropriate. Likewise, any advantage of the first aspect may equally apply to the second, third, fourth, fifth, sixth, seventh, eight, ninth, tenth, eleventh, and/or twelfth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, on which.

Like numbers refer to like elements throughout the figures. Any step or feature illustrated by dashed lines should be regarded as optional.

DETAILED DESCRIPTION

The inventive concept will now be described more fully hereinafter with reference to the accompanying drawings, on which certain embodiments of the inventive concept are shown. This inventive concept may however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Figure 2:
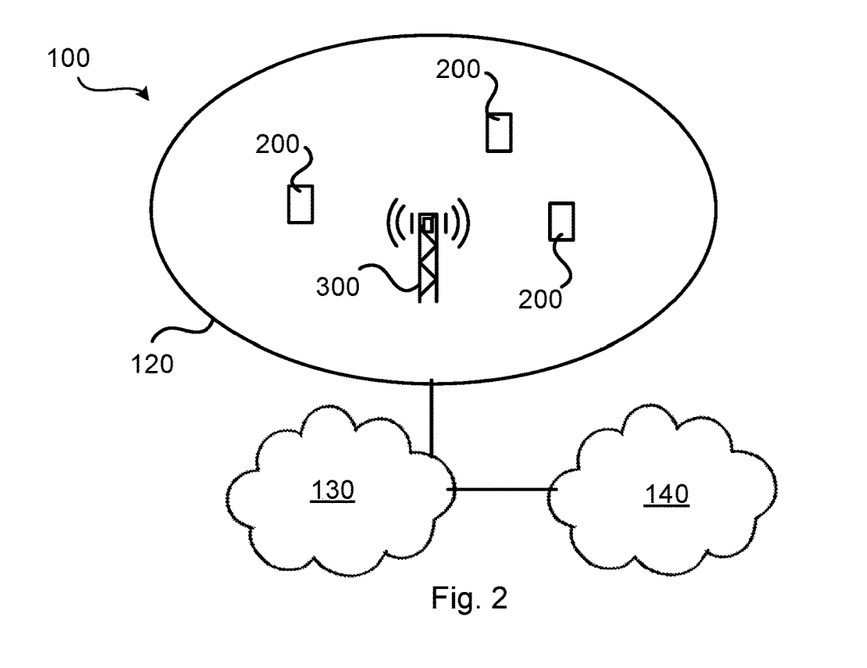
FIG. 2 is a schematic diagram illustrating a communication network according to embodiments.

FIG. 2 is a schematic diagram illustrating a communications network 100 where embodiments presented herein can be applied. The communications network 100 comprises a radio access network (as represented by its radio coverage area 120 in which a radio access network node 300 provides network access), a core network 130, and a service network 140.

The radio access network is operatively connected to the core network 130 which in turn is operatively connected to the service network 140. The radio access network node 300 thereby enables wireless devices 200 to access services and exchange data as provided by the service network 140.

Examples of wireless devices 200 include, but are not limited to, mobile stations, mobile phones, handsets, wireless local loop phones, user equipment (UE), smartphones, laptop computers, tablet computers, sensors, actuators, modems, repeaters, and network-equipped Internet of Things devices. Examples of radio access network nodes 110 include, but are not limited to, radio base stations, base transceiver stations, Node Bs, evolved Node Bs, gNB (in communications networks denoted "new radio" or NR for short), and access points. As the skilled person understands, the communications system 100 may comprise a plurality of radio access network nodes 110, each providing network access to a plurality of wireless devices 200. The herein disclosed embodiments are not limited to any particular number of radio access network nodes 110 or wireless devices 200.

For evolving communications systems, it is envisioned that codewords can be mapped to individual OFDM symbols, or even several codewords per OFDM symbol. It is noted that codewords and OFDM symbols are not necessarily exactly aligned, i.e., some codewords may span multiple OFDM symbols. This may enable the wireless device to start decoding as soon as an OFDM symbol comprising data has been received.

The fifth generation of mobile telecommunications and wireless technology (5G) is not yet fully defined but in an advanced drafting stage within 3GPP. It includes work on 5G (NR) Access Technology. LTE terminology is used in this disclosure in a forward-looking sense, to include equivalent 5G entities or functionalities although a different term may be specified in 5G. A general description of the agreements on 5G New Radio (NR) Access Technology so far is contained in 3GPP TR 38.802 V0.3.0 (2016-10), of which a draft version has been published as R1-1610848. Final specifications may be published inter alia in the future 3GPP TS 38.2** series.

There are a few issues with the above disclosed existing mechanisms for monitoring of (data and) control regions when considering an evolved communications system, where low latency is important, and where beamformed control messaging is used. Furthermore, in an evolved communications system where the wireless devices in some aspects do not know the system bandwidth it may be unnecessary to have an L1/L2 control region spanning the entire, possibly very large bandwidth, when any wireless device only can access a small part of it. For example, the radio access network node may transmit and receive signals over a 100 MHz bandwidth and each wireless device may be limited to transmitting and receiving signals over a 40 MHz bandwidth.

The embodiments disclosed herein therefore relate to mechanisms for monitoring search spaces and for enabling monitoring of search spaces. In order to obtain such mechanisms there are provided a wireless device 200, a method performed by the wireless device 200, a computer program product comprising code, for example in the form of a computer program, that when run on a wireless device 200, causes the wireless device 200 to perform the method. In order to obtain such mechanisms there are provided a radio access network node 300, a method performed by the radio access network node 300, a computer program product comprising code, for example in the form of a computer program, that when run on a radio access network node 300, causes the radio access network node 300 to perform the method.

At least some of the embodiments disclosed herein relate to the transmission, reception, and usage of RSs of different types within an OFDM symbol in the downlink (i.e., as transmitted by the radio access network node and received by the wireless device). The embodiments may equally be applicable to an OFDM symbol transmitted in sidelink. For example, the RSs may be used for demodulation of control channels that may be mapped to a control region.

Figure 3:
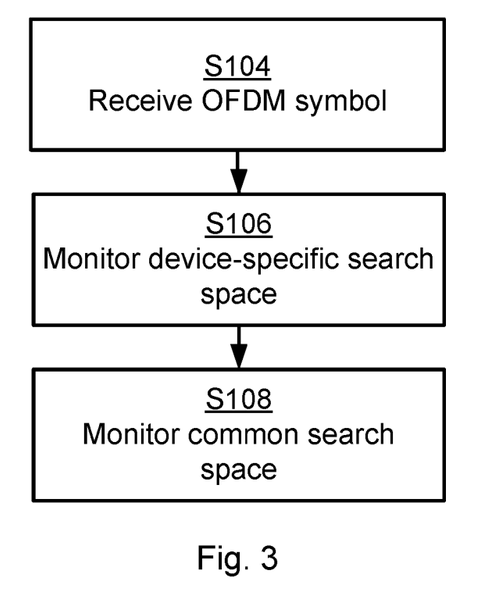
FIGS. 3 4, 5, and 6 are flowcharts of methods according to embodiments.
Figure 4:
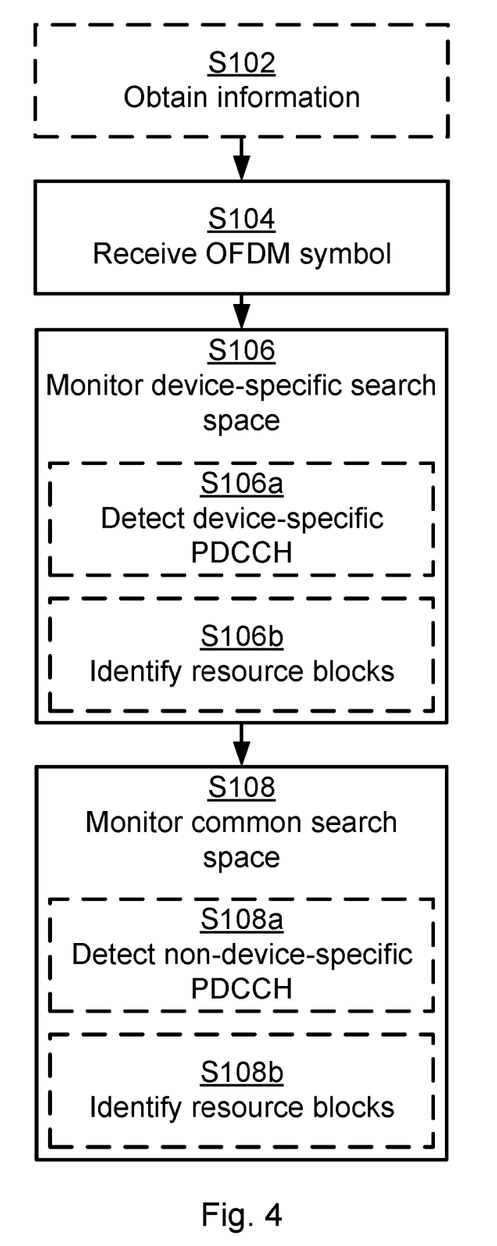

FIGS. 3 and 4 are flowcharts illustrating embodiments as methods for monitoring search spaces. The methods are performed by the wireless device 200. The methods may advantageously be realized by executing computer programs 1320a.

Reference is now made to FIG. 3 illustrating a method for monitoring search spaces as performed by the wireless device 200 according to an embodiment.

If both a common control region in a common search space (enabling beamforming to reach many wireless devices 200) and device-specific regions in device-specific search spaces (enabling beamforming to reach a specific wireless device) are provided in the same OFDM symbol, or at least begin in the same OFDM symbol, latencies may be controlled or reduced. Hence, the wireless device 200 is configured to perform step S104:

S104: The wireless device 200 receives an OFDM symbol in a downlink slot. At least part of the OFDM symbol is included in a device-specific search space and in a common search space.

Upon having received the OFDM symbol the wireless device 200 monitors both a device-specific search space and a common search space and is thus configured to perform steps S106, S108:

S106: The wireless device 200 monitors the device-specific search space for at least one device-specific reference signal.

S108: The wireless device 200 monitors the common search space for at least one non-device-specific reference signal.

In this respect, to monitor the search space for a reference signal is to be interpreted as: to read the search space attempting to recognize the reference signal, to search for the reference signal in the search space, to try to match the reference signal in the search space, to try to decode a control message transmitted in the search space knowing that the reference signal may be present, and/or to try to decode a control message transmitted in the search space assuming the possible presence of the reference signal.

The method thus allows for transmission of both common and device-specific control messages (possibly beamformed differently) in the same OFDM symbol, enabling immediate decoding to start in the first OFDM symbol of any scheduled data region (common and/or device-specific). For this purpose, reference signals for data are preferably inserted in the beginning of the data region.

Embodiments relating to further details of monitoring search spaces as performed by the wireless device 200 will now be disclosed.

There may be different locations of the OFDM symbol in the downlink slot. According to an embodiment the OFDM symbol is the first time-wise occurring OFDM symbol in the downlink slot. Formulated differently, the OFDM symbol is initial in the downlink slot; with respect to time, the OFDM symbol was transmitted before the other symbols. There may be different locations of the device-specific search space. According to an embodiment at least part of the device-specific search space is comprised in the first OFDM symbol. There may be different locations of the common search space. According to an embodiment at least part of the common search space is comprised in the first OFDM symbol.

Reference is now made to FIG. 4 illustrating methods for monitoring search spaces as performed by the wireless device 200 according to further embodiments. It is assumed that steps S104, S106, S108 are performed as in the above description with reference to FIG. 3, which therefore need not be repeated.

The wireless device may be made aware of the different control regions, location and type henceforth. Hence, according to an embodiment the wireless device 200 is configured to perform step S102:

S102: The wireless device obtains information regarding frequency location within the OFDM symbol of the device-specific search space and the common search space.

This information may comprise respective control region location and size in the frequency domain. The location may be based on cell ID. For the device-specific case the information may be device-specific. The frequency locations may be conveyed from the radio access network node 300 to the wireless device 200 by means of semi-static signaling over radio resource control (RRC) signaling, medium access control (MAC) element signaling, dynamic signaling in a previous PDCCH, or by other means. Optionally, the wireless device may obtain the time location of the OFDM symbol, e.g., in terms of the position of the symbol.

Each search space, or control region, may be defined as a set of subbands. Hence, according to an embodiment, each of the device-specific search space and the common search space is contained in a respective frequency subband. Each frequency subband may have a bandwidth in the order of 5 MHz. Different subbands may have different bandwidths. A common control subband and a device-specific control subband can thereby be used within (at least) one and the same OFDM symbol.

A set of non-device-specific demodulation reference signals (DMRS) may be defined for the common subband or common search space, and a set of device-specific DMRS may be defined for the device-specific subband or device-specific search space. Hence, according to an embodiment, the device-specific search space comprises resources reserved for a device-specific DMRS, and the common search space comprises resources reserved for a non-device-specific DMRS. In this respect, the fact that the resources are reserved is to be interpreted as the resources have predefined (or pre-agreed) positions in the time/frequency grid. The remaining resource elements in the OFDM symbol that do not carry RSs may be used for control payload, such as common and/or device-specific PDCCH. Similarly, each subband or search space may comprise resources reserved for multiple DMRSs. If a search space comprises multiple search space candidates, each candidate may be associated with its own DMRS resources. DMRS resources of different candidates may overlap or partially overlap, or may alternatively be disjoint.

As disclosed above, at least part of the OFDM symbol is included in a device-specific search space and in a common search space. An OFDM symbol may thus contain common and device-specific search spaces. Each search space may comprise one or several control channel candidates, such as PDCCH candidates, search space candidates, or search space control channel candidates. If a PDCCH is transmitted, it is transmitted on one of the search space PDCCH candidates. If a PDCCH is transmitted, then also a corresponding DMRS may be transmitted. Depending on which PDCCH is transmitted, there may be two combinations of PDCCH and DMRS simultaneously, otherwise only one. Alternatively, DMRS may be connected to a search space or a search space control channel candidate and transmitted independently of whether PDCCH is transmitted or not.

Hence, according to an embodiment, the wireless device 200 is configured to perform steps S106a, S106b as part of step S106:

S106a: The wireless device 200 detects a device-specific PDCCH message in the device-specific search space.

S106b: The wireless device 200 identifies, from the device-specific PDCCH message, resource blocks for a device-specific data region.

According to a further embodiment the wireless device 200 is configured to perform steps S108a, S108b as part of step S108:

S108a: The wireless device 200 detects a non-device-specific PDCCH message in the common search space.

S108b: The wireless device 200 identifies, from the non-device-specific PDCCH message, resource blocks for a non-device-specific data region.

In this respect, resource elements not used for DMRS within a subband may be utilized for control purposes and/or data transmissions. Resource elements outside the control subbands may be used for data transmissions.

This means that within a same OFDM symbol, the network, via the radio access network node, may transmit a PDCCH addressed to multiple wireless devices 200 using a first beamforming setting, and may transmit a PDCCH addressed to a specific wireless device 200 using a second beamforming setting, different from the first beamforming setting. Preferably, the first beamforming setting is relatively wide or at least wider than the second beamforming setting. In this connection, a wide setting is one expected to have a low degree of spatial or angular selectivity; in line-of-sight conditions, this corresponds to a large beam angle. This allows the wireless device 200 to monitor the search space(s) in the control regions for both group messages and individual messages, decode these PDCCHs as early as is theoretically possible and start decoding data code words virtually immediately in the addressed data region.

It can even be envisioned that parts of the OFDM symbol not used for control are used for data. The control regions might not occupy all resources in the OFDM symbol, and hence there may be resources left in the OFDM symbol that may be utilized for e.g. data traffic to at least one wireless device 200.

Figure 5:
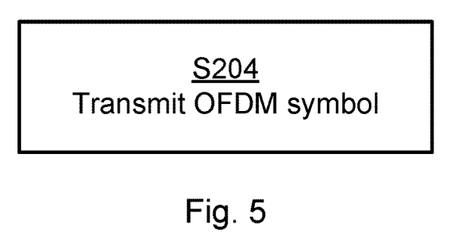
Figure 6:
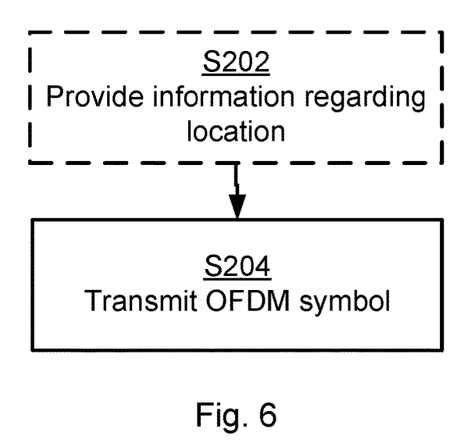

FIGS. 5 and 6 are flowcharts illustrating embodiments as methods for enabling monitoring of search spaces. The methods are performed by the radio access network node 300. The methods may advantageously be realized by executing computer programs 1320*b*. In these example embodiments, the radio access network node 300 transmits an OFDM symbol in downlink, but variations are equally possible where an OFDM symbol is transmitted in sidelink.

Reference is now made to FIG. 5 illustrating a method for enabling monitoring of search spaces as performed by the radio access network node 300 according to an embodiment.

As disclosed above, the wireless device 200 in a step S104 receives an OFDM symbol in a downlink slot. It is assumed that the radio access network node 300 transmits such an OFDM symbol. Hence, the radio access network node 300 is configured to perform step S204.

S204: The radio access network node 300 transmits an OFDM symbol in a downlink slot. At least part of the OFDM symbol is included in a device-specific search space and a common search space. The device-specific search space comprises a device-specific reference signal, and/or the common search space comprises a non-device-specific reference signal.

It is noted for completeness, that at least one of the search spaces comprises a RS if a physical control channel is transmitted in the downlink slot. If no physical control channel is transmitted, no RS is present.

Embodiments relating to further details of enabling monitoring of search spaces as performed by the radio access network node 300 will now be disclosed.

Thus, at least one of (a) and (b) in the following holds: (a) the device-specific search space comprises a device-specific reference signal, (b) the common search space comprises a non-device-specific reference signal.

According to an embodiment the device-specific reference signal enables a specific wireless device 200 or a specific group of wireless devices to monitor control messages.

According to an embodiment the non-device-specific reference signal enables non-specific wireless devices in a coverage area of the radio access network node 300 to monitor control messages.

Reference is now made to FIG. 6 illustrating methods for enabling monitoring of search spaces as performed by the radio access network node 300 according to further embodiments. It is assumed that step S204 is performed as described above with reference to FIG. 5, so that this description need not be repeated.

As disclosed above, according to an embodiment the wireless device 200 obtains location information. Hence, according to an embodiment the radio access network node 300 is configured to perform step S202:

S202: The radio access network node 300 provides information regarding frequency within the OFDM symbol of the device-specific search space and the common search space to a wireless device 200.

Further embodiments applicable to both the wireless device 200 and the radio access network node 300 will now be disclosed.

Figure 7:
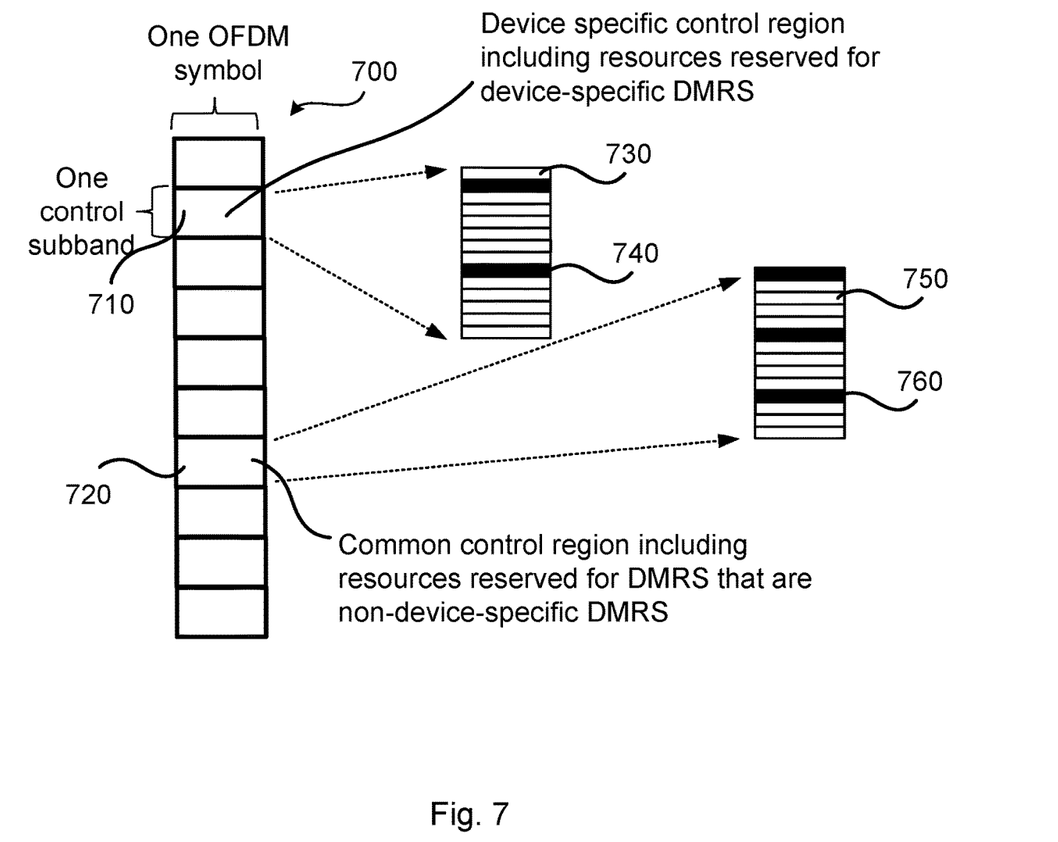
FIG. 7 schematically illustrates an OFDM symbol structure according to an embodiment.

FIG. 7 schematically illustrates an OFDM symbol structure 700 comprising both device-specific and non-device-specific control regions 710, 720. Respective control regions comprise resources for respective DMRS. Each control region comprises resource elements (RE) 740, 760 that are reserved for DMRS. Further REs 730, 750 may contain the PDCCH messages. The densities of the DMRS may be different in different control regions or may be uniform. The density and locations of respective DMRS may be configured or be in accordance with a fixed pattern, in dependence of the subband. Further, the DMRS may be associated with individual search space PDCCH candidates and only be transmitted if a PDCCH is actually transmitted. If a DMRS is associated with an individual search space PDCCH candidate, DMRS resources of different candidates may overlap, partially overlap or may alternatively be disjoint.

The radio access network node may be configured to only send a reference signal of a certain type if it also sends a PDCCH message of that type. In that way interference levels in the network may be controlled, or kept small. When transmitted, the reference signals may be located in the vicinity of the sent PDCCH message within the control region.

Figure 8:
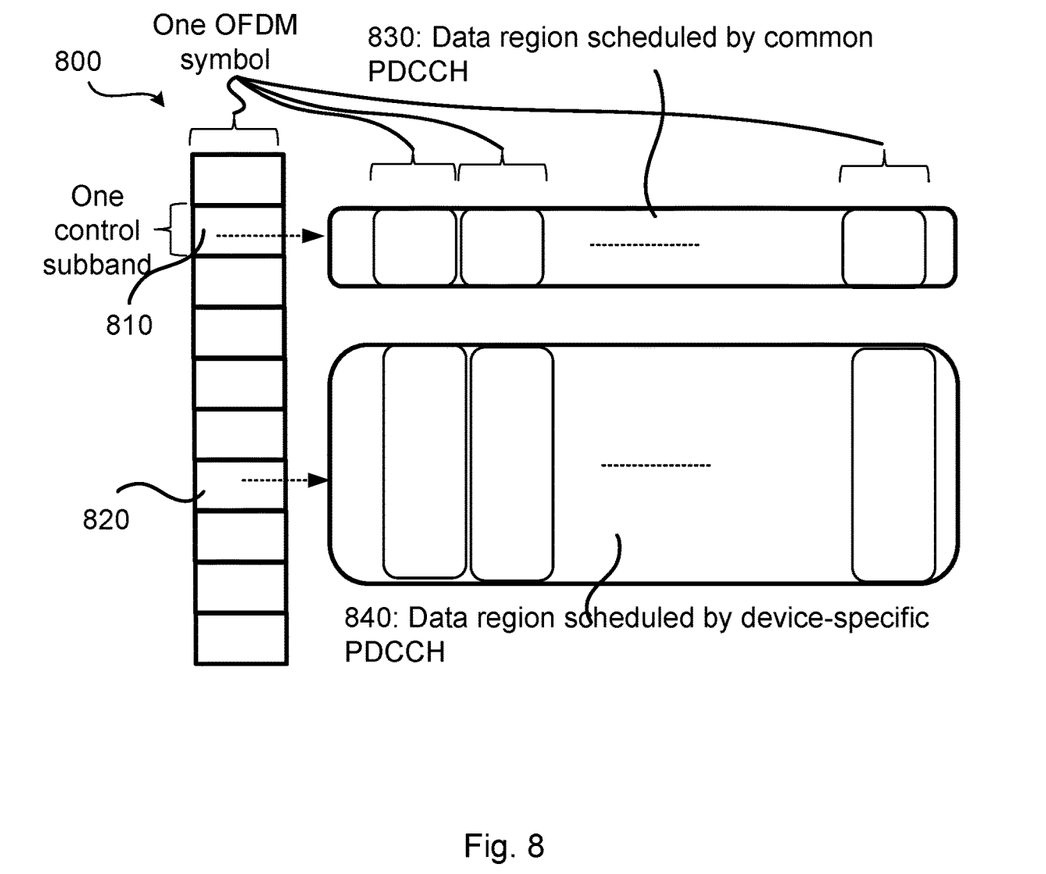
FIG. 8 schematically illustrates control regions comprising PDCCHs scheduling data regions, according to an embodiment.

FIG. 8 illustrates an OFDM symbol structure 800 comprising both device-specific and non-device-specific control regions (PDCCHs) 810, 820 identifying the location in time and/or frequency of data regions 830, 840. If the code words in one or both of the common or user-specific (or device-specific) region are arranged for decoding per OFDM symbol, latency may be reduced. In FIG. 8 the two types of control regions are non-overlapping, but they may alternatively be fully or partially overlapping.

Hence, according to an embodiment the device-specific search space and the common search space at least partially overlap. In case the common control region and the device-specific control region (partially) overlap, the respective reference signals must be distinguishable. There are several ways this may be ensured. The allocation may be that RSs (of a certain type) are only available when a PDCCH (of that type) is actually transmitted. Then preferably the RSs are transmitted only in the vicinity of the sent PDCCH. Since the radio access network node is aware of what it sends in a given resource, the radio access network node can ensure that different types of RSs are distinguishable. The wireless device 200 only has to monitor the overlapping search spaces using different assumptions concerning the RS type and concerning location of candidate message and RSs. RSs can be made distinguishable if they are transmitted in a non-overlapping fashion, in well enough isolated beams, or using orthogonal or quasi-orthogonal RS sequences. Different RS for the different search spaces may thus enable a device to distinguish between a control message transmitted in a common search space and in a device-specific search space, even if the control channel transmissions would use the same time-frequency resources.

Alternatively, the device-specific search space and the common search space are separated (or disjoint). Hence, according to another embodiment the device-specific search space and the common search space do not overlap. An allocation scheme may be used to ensure that the device-specific RSs and the common RSs do not overlap.

Device-specific RSs may have properties or characteristics which are dependent on the wireless device, a wireless device identity, a Cell Radio Network Temporary Identifier (CRNTI), wireless device capabilities, a configured parameter for the wireless device, or any other characteristic that may differentiate two or more wireless devices or may differentiate two or more groups of wireless devices.

Non-device-specific RSs may have properties or characteristics which are dependent on a cell ID, a location in the time or frequency domain, or a parameter configured for a set of wireless devices. A set of wireless devices in this sense may comprise those wireless devices which are to receive the PDCCH in the common search space; the set may in particular comprise all wireless devices in a cell.

According to embodiments disclosed herein a control region may thus be monitored by means of so called search spaces, where a search space defines the possible locations of a control message. Properties of a search space may depend on a size of used control resources; for instance, in LTE the size is given by the aggregation level. If there are many possible aggregation levels/sizes of mapped control messages, there are many search spaces. This is true for both device-specific and common control regions. The embodiments disclosed herein are not dependent on, or limited to, the exact structure of the control regions or how they are to be monitored.

An illustrative example of a search space consisting of one single subband has been used throughout this description, but as understood by a person of ordinary skill in the art, search spaces may have a different number of subbands, possibly of different sizes. That is, although the embodiments and examples disclosed herein depict only one OFDM symbol comprising control messages, it is clear to the skilled person that there may be one or more than one OFDM symbol comprising control messages as long as at least one OFDM symbol comprises both device-specific and non-device-specific search spaces.

Figure 9:
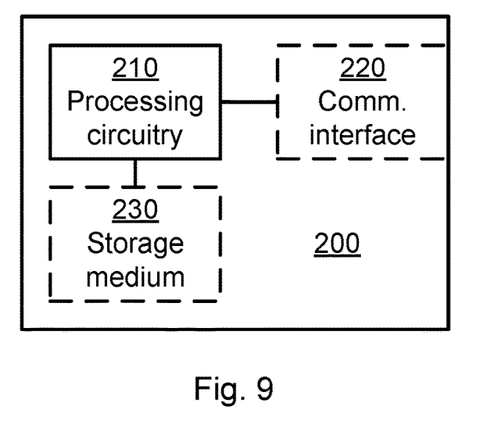
FIG. 9 is a schematic diagram showing functional units of a wireless device according to an embodiment.

FIG. 9 schematically illustrates, in terms of a number of functional units, the components of a wireless device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1310a (as in FIG. 13), e.g. in the form of a storage medium 230. The processing circuitry 210 may further be provided as at least one application-specific integrated circuit (ASIC), or field programmable gate array (FPGA).

Particularly, the processing circuitry 210 is configured to cause the wireless device 200 to perform a set of operations, or steps, S102-S108, as disclosed above. For example, the storage medium 230 may store the set of operations, and the processing circuitry 210 may be configured to retrieve the set of operations from the storage medium 230 to cause the wireless device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The wireless device 200 may further comprise a communications interface 220 at least configured for communications with a radio access network node. As such the communications interface 220 may comprise one or more transmitters and receivers, comprising analogue and digital components. The processing circuitry 210 controls the general operation of the wireless device 200 e.g. by sending data and control signals to the communications interface 220 and the storage medium 230, by receiving data and reports from the communications interface 220, and by retrieving data and instructions from the storage medium 230. Other components, as well as the related functionality, of the wireless device 200 are omitted in order not to obscure the concepts presented herein.

Figure 10:
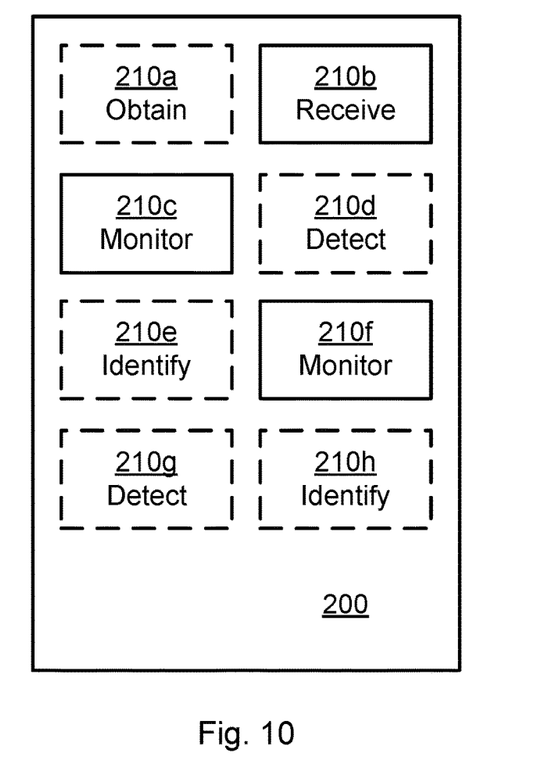
FIG. 10 is a schematic diagram showing functional modules of a wireless device according to an embodiment.

FIG. 10 schematically illustrates, in terms of a number of functional modules, the components of a wireless device 200 according to an embodiment. The wireless device 200 of FIG. 10 comprises a number of functional modules; a receive module 210b configured to perform step S104, a monitor module 210c configured to perform step S106, and a monitor module 210f configured to perform step S108. The wireless device 200 of FIG. 10 may further comprise a number of optional functional modules, such as any of an obtain module 210a configured to perform step S102, a detect module 210d configured to perform step S106a, an identify module 210e configured to perform step S106b, a detect module 210g configured to perform step S108a, and an identify module 210h configured to perform step S108b.

In general terms, each functional module 210a-210h may in one embodiment be implemented only in hardware or and in another embodiment with the help of software, i.e., the latter embodiment having computer program instructions stored on the storage medium 230 which when run on the processing circuitry makes the wireless device 200 perform the corresponding steps mentioned above in conjunction with FIG. 10. It should also be mentioned that even though the modules correspond to parts of a computer program, they do not need to be separate modules therein, but the way in which they are implemented in software is dependent on the programming language used. Preferably, one or more or all functional modules 210a-210h may be implemented by the processing circuitry 210, possibly in cooperation with the communications interface 220 and/or the storage medium 230. The processing circuitry 210 may thus be configured to from the storage medium 230 fetch instructions as provided by a functional module 210a-210h and to execute these instructions, thereby performing any steps as disclosed herein.

Figure 11:
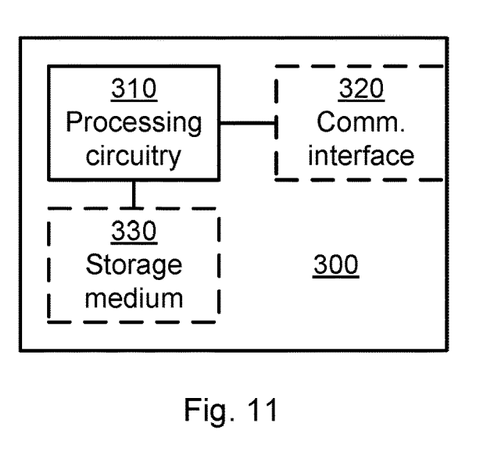
FIG. 11 is a schematic diagram showing functional units of a radio access network node according to an embodiment.

FIG. 11 schematically illustrates, in terms of a number of functional units, the components of a radio access network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1310b (as in FIG. 13), e.g. in the form of a storage medium 330. The processing circuitry 310 may further be provided as at least one application-specific integrated circuit (ASIC), or field programmable gate array (FPGA).

Particularly, the processing circuitry 310 is configured to cause the radio access network node 300 to perform a set of operations, or steps, S202-S204, as disclosed above. For example, the storage medium 330 may store the set of operations, and the processing circuitry 310 may be configured to retrieve the set of operations from the storage medium 330 to cause the radio access network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The radio access network node 300 may further comprise a communications interface 320 for communications with other entities and devices of the communications network 100 and the wireless device 200. As such the communications interface 320 may comprise one or more transmitters and receivers, comprising analog and digital components.

The processing circuitry 310 controls the general operation of the radio access network node 300 e.g. by sending data and control signals to the communications interface 320 and the storage medium 330, by receiving data and reports from the communications interface 320, and by retrieving data and instructions from the storage medium 330. Other components, as well as the related functionality, of the radio access network node 300 are omitted in order not to obscure the concepts presented herein.

Figure 12:
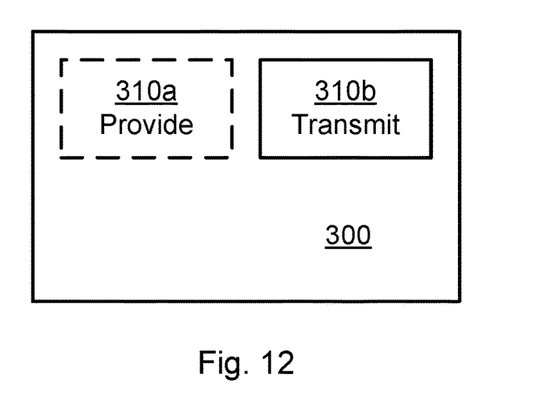
FIG. 12 is a schematic diagram showing functional modules of a radio access network node according to an embodiment.

FIG. 12 schematically illustrates, in terms of a number of functional modules, the components of a radio access network node 300 according to an embodiment. The radio access network node 300 of FIG. 12 comprises a transmit module 310b configured to perform step S204. The radio access network node 300 of FIG. 12 may further comprise a number of optional functional modules, such as a provide module 310a configured to perform step S202. In general terms, each functional module 310a-310b may be implemented in hardware or in software. Preferably, one or more or all functional modules 310a-310b may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310b and to execute these instructions, thereby performing any steps of the radio access network node 300 as disclosed herein.

Figure 13:
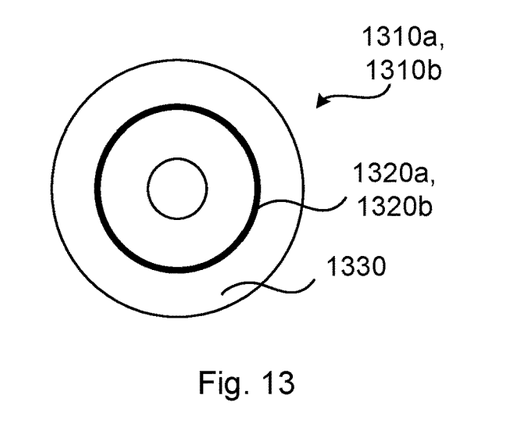
FIG. 13 shows one example of a computer program product comprising computer readable storage medium according to an embodiment.

FIG. 13 shows one example of a computer program product 1310a, 1310b comprising computer readable means 1330. On this computer readable means 1330, a computer program 1320a can be stored, which computer program 1320a can cause the processing circuitry 210 and thereto operatively coupled entities and devices, such as the communications interface 220 and the storage medium 230, to execute methods according to embodiments described herein. The computer program 1320a and/or computer program product 1310a may thus provide means for performing any steps of the wireless device 200 as herein disclosed. On this computer readable means 1330, a computer program 1320b can be stored, which computer program 1320b can cause the processing circuitry 310 and thereto operatively coupled entities and devices, such as the communications interface 320 and the storage medium 330, to execute methods according to embodiments described herein. The computer program 1320b and/or computer program product 1310b may thus provide means for performing any steps of the radio access network node 300 as herein disclosed.

In the example of FIG. 13, the computer program product 1310a, 1310b is illustrated as an optical disc, such as a CD (compact disc) or a DVD (digital versatile disc) or a Blu-Ray disc. The computer program product 1310a, 1310b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320a, 1320b is here schematically shown as a track on the depicted optical disk, the computer program 1320a, 1320b can be stored in any way which is suitable for the computer program product 1310a, 1310b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for monitoring search spaces, the method being performed by a wireless device, the method comprising:
   receiving an orthogonal frequency-division multiplexing (OFDM) symbol in a downlink slot, wherein a first part of the OFDM symbol is included in a device-specific search space and a second part of the OFDM symbol in a common search space;
   monitoring the first part of the OFDM symbol for at least one demodulation reference signal (DM-RS); and
   monitoring the second part of the OFDM symbol for at least one DM-RS.

2. The method of claim 1, further comprising:
   detecting a device-specific physical downlink control channel (PDCCH) message in the first part of the OFDM symbol; and
   identifying, from the device-specific PDCCH message, resource blocks for a device-specific data region.

3. The method of claim 1, further comprising:
   detecting a non-device-specific physical downlink control channel (PDCCH) message in the second part of the OFDM symbol;
   identifying, from the non-device-specific PDCCH message, resource blocks for a non-device-specific data region.

4. The method of claim 1, wherein at least part of the device-specific search space is comprised in the first OFDM symbol.

5. The method of claim 1, wherein at least part of the common search space is comprised in the first OFDM symbol.

6. The method of claim 1, wherein each of the device-specific search space and the common search space is contained in a respective frequency subband.

7. The method of claim 1, wherein the OFDM symbol is an initial OFDM symbol in the downlink slot.

8. The method of claim 1, wherein the first part of the OFDM symbol comprises resources reserved for a device-specific demodulation reference signal (DMRS), and wherein the second part of the OFDM symbol comprises resources reserved for a non-device-specific DMRS.

9. The method of claim 1, wherein the non-device-specific demodulation reference signal (DMRS) depends on cell parameters, and wherein the device-specific DMRS depends on at least one parameter of the wireless device.

10. The method of claim 1, wherein the first part of the OFDM symbol and the second part of the OFDM symbol at least partially overlap.

11. The method of claim 1, wherein the first part of the OFDM symbol and the second part of the OFDM symbol are mutually disjoint.

12. The method of claim 1, further comprising:
obtaining information regarding frequency location within the OFDM symbol of the first part of the OFDM symbol and the second part of the OFDM symbol.

13. A wireless device for monitoring search spaces, the wireless device comprising:
processing circuitry;
a communication interface operatively connected to the processing circuitry; and
a storage medium operatively connected to the processing circuitry and storing instructions that, when executed by the processing circuitry, cause the wireless device to:
receive an orthogonal frequency-division multiplexing (OFDM) symbol in a downlink slot using the communication interface, wherein a first part of the OFDM symbol is included in a device-specific search space and a second part of the OFDM symbol in a common search space;
monitor the first part of the OFDM symbol for at least one demodulation reference signal (DM-RS); and
monitor the second part of the OFDM symbol for at least one DM-RS.

14. A non-transitory computer-readable medium comprising, stored thereupon, a computer program for monitoring search spaces, the computer program comprising computer code configured so that, when the computer code is run on processing circuitry of a wireless device, the computer code causes the wireless device to:
receive an orthogonal frequency-division multiplexing (OFDM) symbol in a downlink slot, wherein a first part of the OFDM symbol is included in a device-specific search space and a second part of the OFDM symbol in a common search space;
monitor the first part of the OFDM symbol for at least one demodulation reference signal, (DM-RS); and
monitor the second part of the OFDM symbol for at least one DM-RS.

15. A method for enabling monitoring of search spaces, the method being performed by a radio access network node, the method comprising:
transmitting an orthogonal frequency-division multiplexing (OFDM) symbol in a downlink slot, wherein a first part of the OFDM symbol is included in a device-specific search space and a second part of the OFDM symbol in a common search space,
wherein the first part of the OFDM symbol comprises a demodulation reference signal (DM-RS) and/or the second part of the OFDM symbol comprises a DM-RS.

16. The method of claim 15, wherein the device-specific reference signal enables a specific wireless device or a specific group of wireless devices to monitor control messages.

17. The method of claim 15, wherein the non-device-specific reference signal enables non-specific wireless devices in a coverage area of the radio access network node to monitor control messages.

18. The method of claim 15, further comprising:
providing information regarding frequency location within the OFDM symbol of the first part of the OFDM symbol and the second part of the OFDM symbol to a wireless device.

19. The method of claim 15, wherein the non-device-specific reference signal depends on cell parameters, and wherein the device-specific reference signal depends on at least one parameter of the wireless device.

20. A radio access network node for enabling monitoring of search spaces, the radio access network node comprising:
processing circuitry;
a communication interface operatively connected to the processing circuitry; and
a storage medium operatively connected to the processing circuitry and storing instructions that, when executed by the processing circuitry, cause the radio access network node to:
transmit an orthogonal frequency-division multiplexing (OFDM) symbol in a downlink slot using the communications interface, wherein a first part of the OFDM symbol is included in a device-specific search space and a second part of the OFDM symbol in a common search space;
wherein the first part of the OFDM symbol comprises a demodulation reference signal (DM-RS) and/or the second part of the OFDM symbol comprises a DM-RS.

21. A non-transitory computer-readable medium comprising, stored thereupon, a computer program for enabling monitoring of search spaces, the computer program comprising computer code configured so that, when the computer code is run on processing circuitry of a radio access network node, the computer code causes the radio access network node to:
transmit an orthogonal frequency-division multiplexing (OFDM) symbol in a downlink slot, wherein a first part of the OFDM symbol is included in a device-specific search space and a second part of the OFDM symbol in a common search space;
wherein the first part of the OFDM symbol comprises a demodulation reference signal (DM-RS) and/or the second part of the OFDM symbol comprises a DM-RS.

* * * * *